Patented May 20, 1947

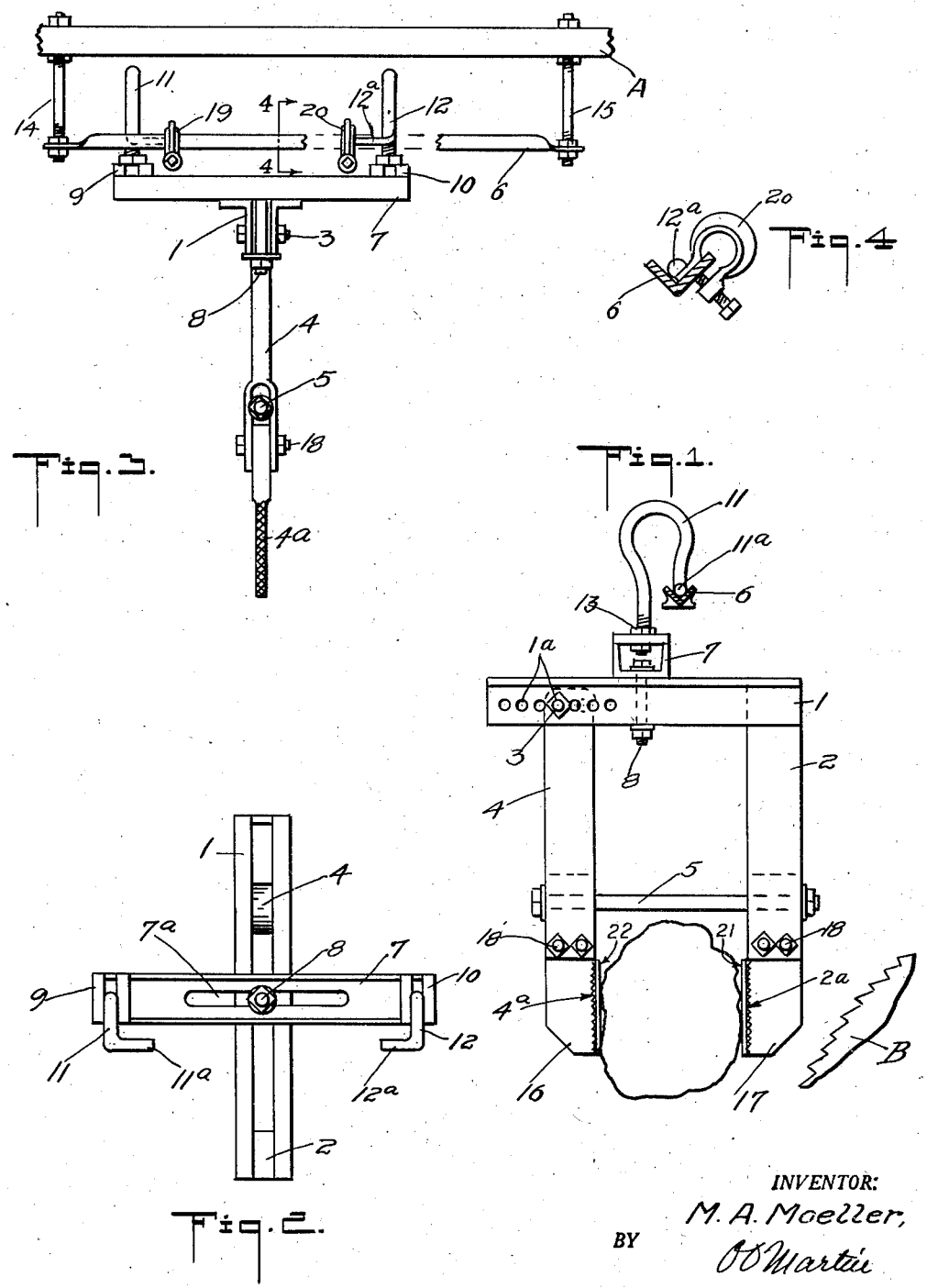

2,420,790

UNITED STATES PATENT OFFICE 2,420,790

STONECUTTING CLAMP

Morris A. Moeller, Long Beach, Calif.

Application December 29, 1945, Serial No. 637,977

10 Claims. (Cl. 125—35)

This invention relates to a device for cutting semi-precious stones into slabs or slices of various thicknesses having parallel or relatively inclined surfaces.

To this end, the invention consists in the combinations hereinafter fully described and illustrated in the accompanying drawings of which:

Fig. 1 is a side view of a device embodying the invention;

Fig. 2 is a plan view of the device of Fig. 1;

Fig. 3 is a substantially corresponding end view of the device; and

Fig. 4 is a detail view of parts of the device taken substantially on line 4—4 of Fig. 3.

The structure of the invention, in the form illustrated in the drawings, comprises a clamp which is adjustable to grip the stone to be cut. This clamp includes a bifurcated head-piece 1, from which depends an arm 2. The head-piece is made with a series of transverse perforations 1a, of a size to receive a bolt 3, and a second arm 4 is shown hung on this bolt within the bifurcation of the head-piece. Through the two arms extend alined perforations, in which an adjusting bolt 5 is seated.

In operation, the clamp is in the first instance adjusted to the size of stone to be cut, whereupon the bolt 5 is tightened firmly to grip the rock. In order to insure a firm grip on the rock, it is required to serrate the gripping surfaces of the arms, substantially as shown at 2a, 4a.

The clamp is held suspended from a trough-shaped track 6 in the following manner. A channeled bar 7 is by a bolt 8, which extends through an elongated perforation 7a of the bar, secured in position on the clamp and this bar is fitted at the ends thereof with transverse guide members 9, 10, having therein elongated perforations of a size to receive hangers 11, 12. The latter are made hook-shaped and they are clamped in position in the guides 9, 10 by means of nuts 13 engaging the lower extremities of the hangers. The outer portion of the hangers ride in the track 6, and the ends thereof are shown laterally extended to form shoes 11a, 12a, which provide better bearing surfaces for the hangers.

The track 6 is in the drawings shown suspended from a ceiling beam A, or some other stationary object by means of bolts 14, 15, but I wish it understood that it may be supported in any other manner found most convenient. As shown in Fig. 1 the track is so mounted relative to the saw B that the clamp may be swung on the pivot formed by the shoes 11a, 12a seated in the track until the rock reaches and passes across the saw.

The semi precious stones, for cutting of which the device is designed, vary greatly in size and shape, and the thickness of the slice which is produced may also greatly vary. It is, for this reason, necessary to adjust the clamp transversely relative to the saw, and this is done by moving the hangers within the guides 9, 10. And, of course, where more than one piece is to be cut off, the clamp is moved step by step in the same manner.

It is not always required to cut off pieces with parallel surfaces, but it is often desired to change the angular relation of the faces thereof. This may readily be done by loosening the bolt 8 and to turn the clamp on the channeled bar 7 until the desired angular adjustment is reached. The bolt is then again tightened.

In order to be able to adjust the width of the clamp more closely to the size of the rock to be cut, it is advantageous to place perforations 4a in the arm 4, thereby to obtain clamping positions intermediate the perforations 1a. The distance between the perforations 4a should, of course, be greater or less that the distance between the perforations 1a.

As above stated, the thickness of the slices to be cut may vary considerably and, when very thin slabs are to be cut, it may be advantageous to decrease the thickness of the arms, which, for this purpose, are shown made with removable clamping jaws 16, 17. These jaws are shown secured in position by means of bolts 18 so that they may be readily removed and replaced by others of a different thickness.

Great care is necessary in order correctly to adjust the clamp longitudinally on the track 6 and to lock it in adjusted position thereon. To this end, I employ screw clamps 19, 20, which are placed on the track between and in contact with the inner ends of the shoes 11a, 12a, substantially as indicated in Figs. 3 and 4. By the above enumerated means it is possible very closely to adjust the clamp relative to the saw.

It is also well, in order to obtain a firm grip on the rock, to place linings 21, 22, of soft metal such as lead, on the inner surfaces of the jaws 16, 17 as indicated in Fig. 1.

I claim:

1. A device for supporting semi-precious stones to be cut comprising a trough-shaped track, a clamp, means for adjusting said clamp to grip a rock to be cut, and members on said clamp freely riding in said track to maintain the clamp suspended therefrom for oscillating movement relative thereto.

2. A device for supporting semi-precious stones to be cut comprising, a trough-shaped track, a bar, members on said bar freely riding in said track for longitudinal and oscillating movement therein, a clamp secured to said bar for rotative movement relative thereto, and means for adjusting said clamp firmly to grip a rock to be cut.

3. A device for supporting semi-precious stones to be cut comprising a track, a bar, members on said bar riding in said track for longitudinal and oscillating movement therein, a bifurcated frame secured to said bar for longitudinal and rotative movement relative thereto, an arm rigidly seated in one end of said frame, a second arm pivotally hung in the frame for adjustment longitudinally thereof, and means for relatively adjusting said arms firmly to grip a rock to be cut.

4. A device for supporting semi-precious stones to be cut comprising a trough-shaped track, a clamp, means for adjusting said clamp to grip a rock to be cut, and members on said clamp freely riding in said track to maintain the clamp suspended therefrom for oscillating movement relative thereto, and means for locking said members against longitudinal movement in the track.

5. A device for supporting semi-precious stones to be cut comprising a trough-shaped track, a bar, members on said bar freely riding in said track for longitudinal and oscillating movement therein, a clamp secured to said bar for rotative movement relative thereto, and means for adjusting said clamp firmly to grip a rock to be cut, and means for locking said members against longitudinal movement in the track.

6. A device for supporting semi-precious stones to be cut comprising a track, a bar, members on said bar riding in said track for longitudinal and oscillating movement therein, a bifurcated frame secured to said bar for longitudinal and rotative movement relative thereto, and arm rigidly seated in one end of said frame, a second arm pivotally hung in the frame for longitudinal adjustment thereon, means for relatively adjusting said arm firmly to grip a rock to be cut, and means for locking said members against longitudinal movement in the track.

7. A device for supporting semi-precious stones to be cut comprising, a V-shaped track, a clamp, interchangeable jaws for said clamp, means for adjusting said clamp to cause the jaws of the clamp firmly to grip the rock to be cut, and members rising from said clamp and riding in said track to maintain the clamp suspended therefrom for oscillating movement relative thereto.

8. A device for supporting semi-precious stones to be cut comprising, a V-shaped track, a clamp, interchangeable jaws for said clamp, soft metal gripping surfaces on said jaws, means for adjusting said clamp to cause the jaws of the clamp firmly to grip the rock to be cut, and members rising from said clamp and riding in said track to maintain the clamp suspended therefrom for oscillating movement relative thereto.

9. A device for supporting semi-precious stones to be cut comprising, a V-shaped track, a clamp, interchangeable jaws for said clamp, means for adjusting said clamp to cause the jaws of the clamp firmly to grip the rock to be cut, members rising from said clamp and riding in said track to maintain the clamp suspended therefrom for oscillating movement relative thereto, and means for locking said members against longitudinal movement in said track.

10. A device for supporting semi-precious stones comprising, a V-shaped track, a bar, hook-shaped members rising from said bar to ride in said track, for longitudinal and oscillating movement therein, a bifurcated frame secured to said bar for longitudinal and rotative movement relative thereto, an arm rigidly seated in one end of said frame, a second arm pivotally hung in the frame for adjustment longitudinally therein, soft metal gripping surfaces on said arm, means for relatively adjusting said arms firmly to grip a rock to be cut, and means for locking said members against longitudinal movement on the track.

MORRIS A. MOELLER.

REFERENCES CITED

The following references are of record in the file of this patent:

UNITED STATES PATENTS

| Number | Name | Date |
| --- | --- | --- |
| 2,382,897 | Muller | Aug. 14, 1945 |
| 671,830 | Loesser | Apr. 9, 1901 |
| 732,118 | Schenck | June 30, 1903 |